Figure 3:
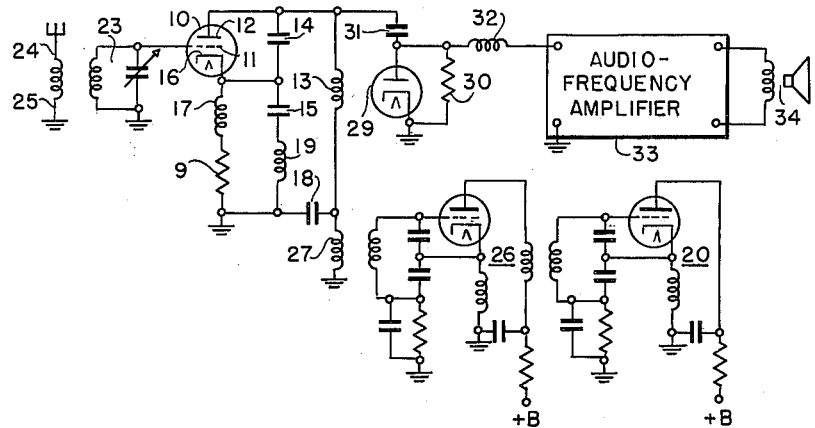

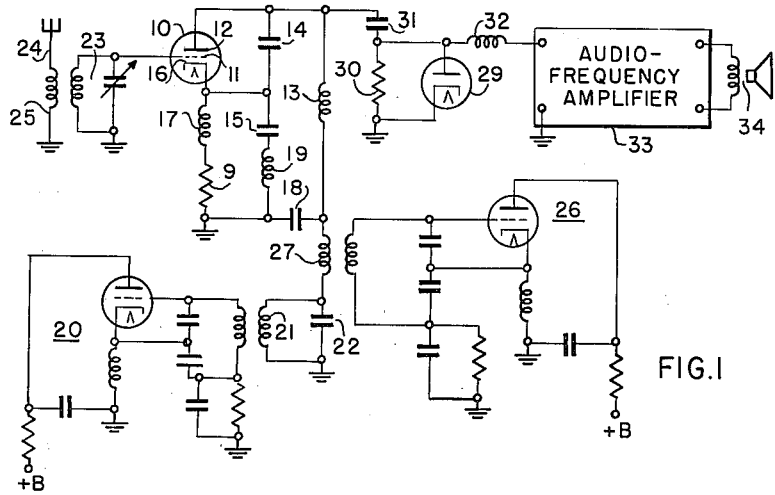
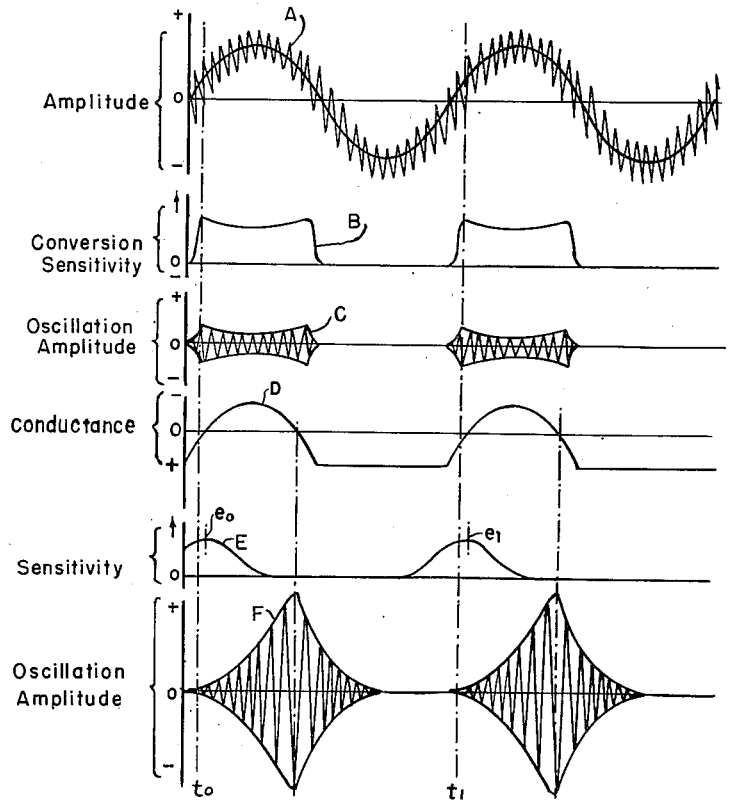
FIG. 2

*INVENTOR.*
BERNARD D. LOUGHLIN

ATTORNEY

March 4, 1952

B. D. LOUGHLIN 2,588,022

SUPERREGENERATIVE SUPERHETERODYNE
WAVE-SIGNAL RECEIVER

Filed Nov. 28, 1947

5 Sheets-Sheet 5

*INVENTOR.*
BERNARD D. LOUGHLIN

BY John A. Harvey

ATTORNEY

Patented Mar. 4, 1952

2,588,022

UNITED STATES PATENT OFFICE 2,588,022

SUPERREGENERATIVE SUPERHETERODYNE WAVE-SIGNAL RECEIVER

Bernard D. Loughlin, Lynbrook, N. Y., assignor to Hazeltine Research, Inc., Chicago, Ill., a corporation of Illinois Application November 28, 1947, Serial No. 788,570

17 Claims. (Cl. 250—20)

The present invention relates to wave-signal receivers and, particularly, to such receivers of the superregenerative or of the superregenerative superheterodyne type. This application is a continuation-in-part of application Serial No. 688,901, now abandoned, filed August 7, 1946, and entitled "Superregenerative Superheterodyne Wave-Signal Receiver."

Superregenerative receivers have heretofore found wide application by virtue of their exceptionally high sensitivity and simplicity. Such receivers find their principal application in the reception of relatively high-frequency modulated wave signals. There are several reasons for this. In the first place, a superregenerative circuit used directly to receive wave signals has relatively poor selectivity, its band width with careful design being at least three times the frequency of the quench voltage used to provide superregeneration. The quench voltage preferably has a frequency at least twice that of the highest frequency modulation component of the received wave signal. Thus, a five-thousand cycle modulation signal would require a ten-thousand cycle quench voltage so that the superregenerative circuit would then have a band width of at least thirty thousand cycles or thirty kilocycles. This is entirely inadequate to provide satisfactory selectivity in the low-frequency transmission channels, such for example as in the broadcast band where the transmission channels are spaced ten kilocycles. This broad selectivity characteristic may be an advantage in high-frequency communication systems, particularly in that it is usually quite difficult to provide high frequency stability of high-frequency transmitters so that a broad band width in the receiver permits the system to tolerate some frequency drift of the transmitter without impairing the operation of the system.

A second reason why superregenerative receivers have found their primary usefulness at high frequencies resides in the fact that the frequency of a received wave signal and the frequency of the necessary quench voltage are then more widely separated in the frequency spectrum. This is important from the standpoint that the exceptionally high sensitivity of the superregenerative receiver tends to cause it to receive high-order harmonics of the quench voltage. Any such received harmonic effectively becomes an interfering signal which impairs reception of the desired wave signal. It is usually preferable to have the lowest wave-signal frequency to be received at least several hundred times the frequency of the quench voltage to minimize the reception of any quench-voltage harmonic frequency.

A disadvantage heretofore characteristic of superregenerative receivers is caused by the fact that the superregenerative circuit thereof generates sustained oscillations during each quench cycle. The superregenerative circuit thus inherently operates as an oscillator and radiation of the generated oscillations may occur unless exceptional care is taken to prevent it. Such radiation, of course, has a pulse-modulation envelope by virtue of the inherent operation of the superregenerative circuit and the modulation components may thus occupy a rather extensive portion of the frequency spectrum. This type of radiation consequently may seriously interfere with the operation of other wave-signal receivers located within a range of several miles of the superregenerative receiver. It is this characteristic of the superregenerative receiver which has heretofore frequently prohibited the coupling of the superregenerative circuit directly to the antenna system of the receiver in those locations where the radiation of the receiver would impair reception by near-by receivers. It has been proposed that the radiation from a superregenerative receiver be minimized by the provision of one or more stages of radio-frequency amplification by which to couple the superregenerative circuit to the antenna system of the receiver. This, however, not only requires additional complexity and increased cost of the receiver, but additionally has not proven entirely adequate in all instances.

It is an object of the present invention, therefore, to provide a new and improved superregenerative wave-signal receiver which avoids one or more of the disadvantages and limitations of prior such receivers.

It is an additional object of the invention to provide a superregenerative wave-signal receiver which may be coupled directly to an antenna system without creating the undesirable radiation heretofore experienced when such receivers were so coupled.

It is a further object of the invention to provide a superregenerative superheterodyne wave-signal receiver having a substantially improved selectivity characteristic.

It is another object of the invention to provide a superregenerative superheterodyne wave-signal receiver adapted to be coupled directly to an antenna system and yet one which when so coupled possesses substantially higher sensitivity and higher operating stability than ordinarily obtainable with prior such receivers operating to receive a wave signal of given frequency.

It is a further object of the invention to provide a superregenerative superheterodyne wave-signal receiver adapted to be tuned over a relatively wide range of wave-signal frequencies yet one characterized by substantially constant superregenerative gain over such tuning range.

It is an additional object of the invention to provide a superregenerative superheterodyne wave-signal receiver which, for the reception of very high-frequency wave signals, more easily enables the attainment of the maximum usable superregenerative gain.

It is yet another object of the invention to provide a superregenerative superheterodyne wave-signal receiver of substantially simplified circuit arrangement utilizing a minimum number of circuit components.

In accordance with a particular form of the invention, a superregenerative superheterodyne wave-signal receiver comprises a superregenerative circuit including a regenerative oscillatory circuit having parameters so proportioned as to provide therefor a free oscillation frequency differing substantially from the frequency of a received wave signal to be applied thereto. The superregenerative circuit also includes means for effecting alternate oscillation build-up and oscillation decay intervals in the regenerative oscillatory circuit, thereby to effect superregenerative amplification of wave signals having substantially the aforesaid free oscillation frequency. The receiver includes means for applying the above-mentioned received wave signal to the aforesaid regenerative oscillatory circuit and also includes heterodyne signal-supply means coupled to the regenerative oscillatory circuit and having parameters so proportioned as to apply to the regenerative oscillatory circuit a wave signal having a frequency differing from that of the above-mentioned received wave signal substantially by the value of the aforesaid free oscillation frequency to derive in the regenerative oscillatory circuit from the received wave signal and the heterodyne wave signal a wave signal having substantially the above-mentioned free oscillation frequency, whereby the superregenerative circuit provides superregenerative amplification of the derived wave signal and thus effectively of the received wave signal.

For a better understanding of the present invention, together with other and further objects thereof, reference is had to the following description taken in connection with the accompanying drawings, and its scope will be pointed out in the appended claims.

Figure 4:
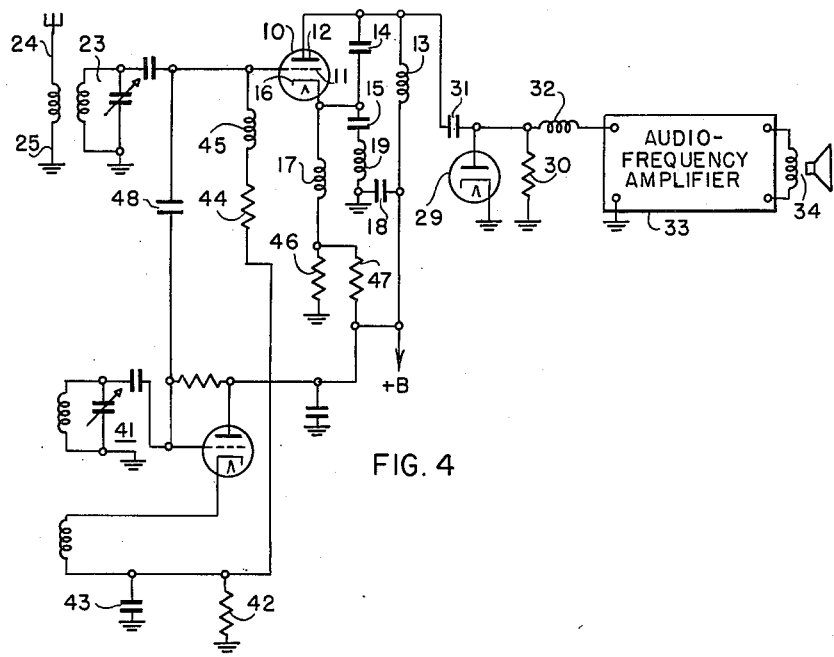
Figure 5:
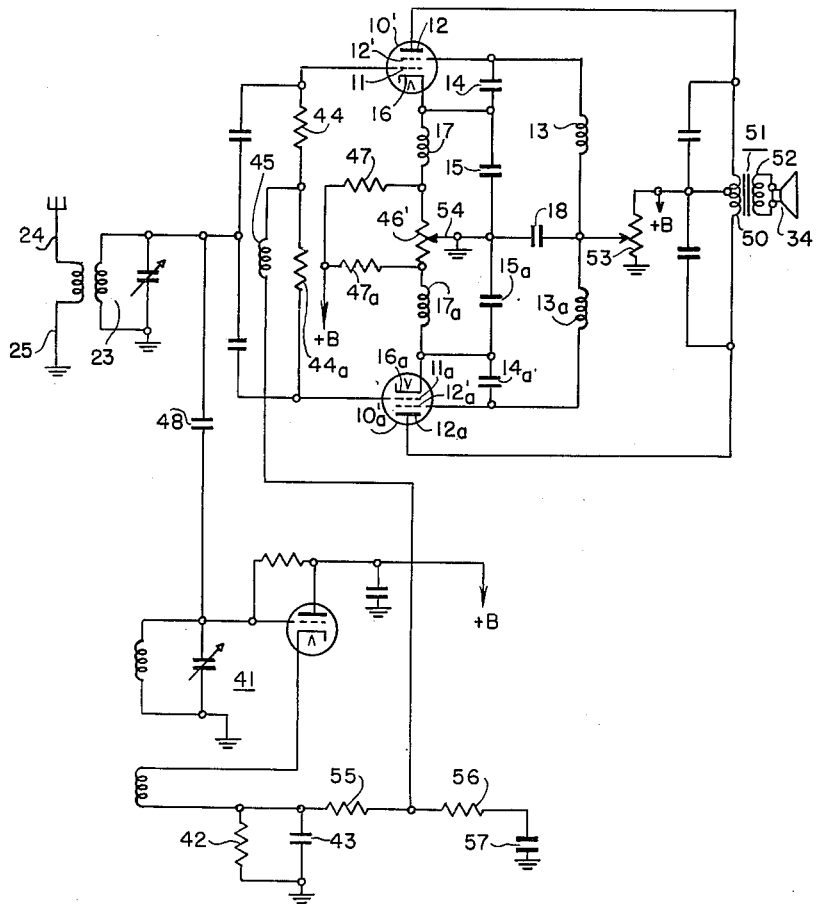
Figure 6:
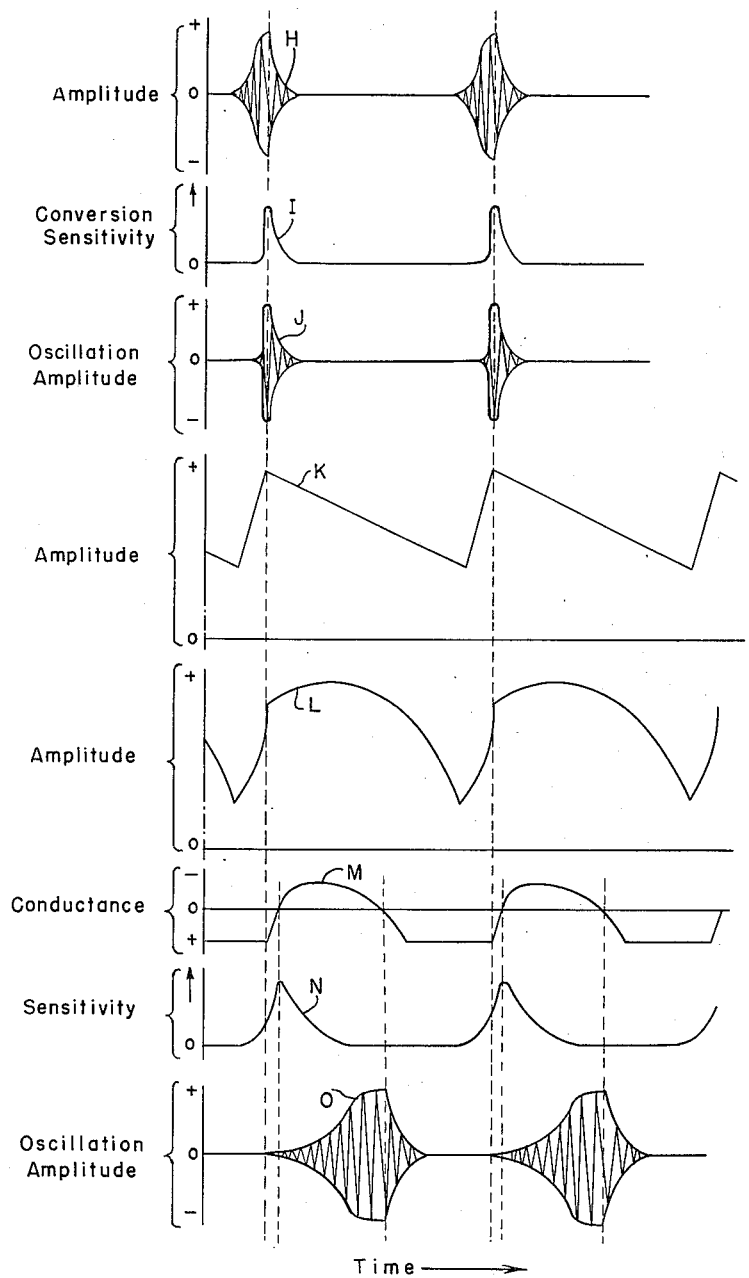
Figure 7:
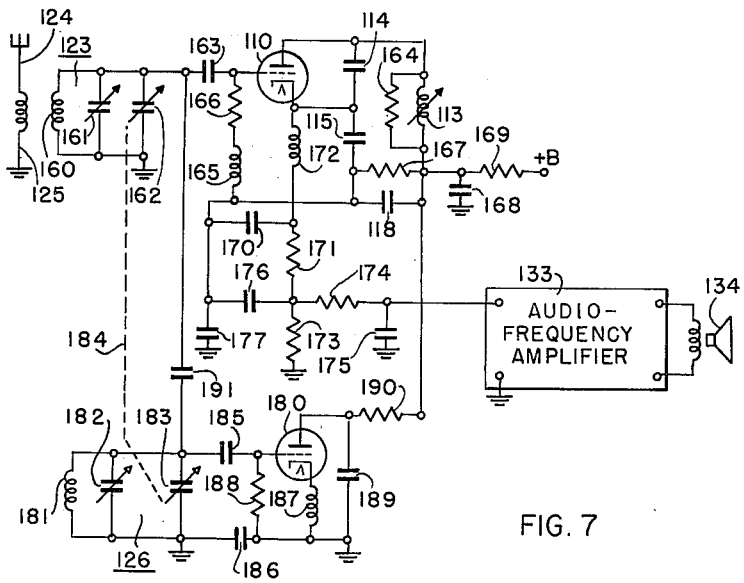
Figure 8:
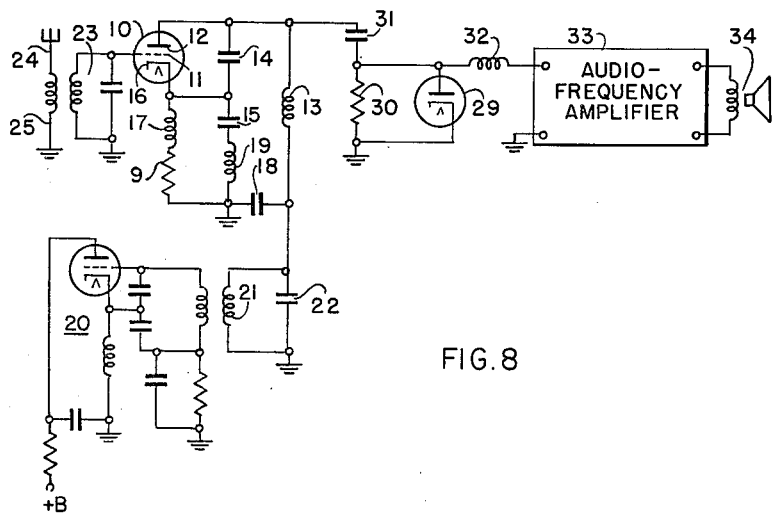

Referring now to the drawings, Fig. 1 is a circuit diagram, partly schematic, representing a complete superregenerative superheterodyne wave-signal receiver embodying the present invention in a particular form; Fig. 2 graphically represents certain operating characteristics of the Fig. 1 receiver and is used as an aid in explaining its operation; Figs. 3, 4, and 5 represent complete superregenerative superheterodyne wave-signal receivers embodying modified forms of the invention; Fig. 6 graphically represents certain operating characteristics of the Fig. 5 receiver and is used as an aid in explaining the operation of the latter; while Figs. 7 and 8 represent further modified forms of the invention.

Referring more particularly to Fig. 1 of the drawings, there is represented, partly schematically, a complete superregenerative superheterodyne wave-signal receiver embodying the present invention in a particular form. This receiver includes a superregenerative circuit having an oscillatory frequency differing from, and preferably lower than, the frequency of a received amplitude-modulated wave signal to be applied to the circuit. This superregenerative circuit comprises a vacuum tube 10 having a control electrode 11 and an anode 12 effectively coupled, in a manner more fully explained hereinafter, across a resonant circuit the essential frequency-determining elements of which comprise an inductor 13 and series-connected condensers 14 and 15 coupled across the inductor.

This resonant circuit has a resonant frequency corresponding to the aforementioned oscillatory frequency of the superregenerative circuit. The vacuum tube 10 includes a cathode 16 which is connected to the junction of the condensers 14 and 15 and is connected to ground through a signal-frequency choke coil 17 and a cathode resistor 9. It is the purpose of the resistor 9 to provide for the control electrode 11 a negative operating bias of sufficient magnitude to maintain the control electrode nonconductive. A condenser 18 and inductor 19 are serially included in the resonant circuit previously described for reasons to be considered hereinafter. The elements heretofore described are commonly known as a regenerative circuit. The superregenerative circuit also includes a quench oscillator 20 of conventional circuit arrangement to provide superregenerative operation of the regenerative circuit. This oscillator is coupled to a parallel-resonant circuit comprising an inductor 21 and a condenser 22 tuned to resonance at the frequency of the quench oscillations. The oscillations of quench frequency developed across the resonant circuit 21, 22 are applied through the inductor 13 to energize the anode 12 of the vacuum tube 10.

The wave-signal receiver also includes means for applying a received wave signal to the superregenerative circuit, this means comprising a parallel-resonant circuit 23 included in the input circuit of the vacuum tube 10 and coupled to an antenna system 24, 25. The resonant circuit 23 has a resonant frequency corresponding to that of the received wave signal.

The receiver additionally includes means for applying to the superregenerative circuit a wave signal having a frequency differing from that of the received wave signal by substantially the value of the oscillatory frequency previously mentioned to derive, in the superregenerative circuit and from the received wave signal, a wave signal having substantially the aforementioned oscillatory frequency and amplitude-modulated in accordance with the amplitude modulation of the received wave signal. This derived wave signal will hereinafter be referred to for simplicity as the intermediate-frequency signal by analogy to conventional superheterodyne practice. For reasons presently to be pointed out, this permits superregenerative amplification of the derived intermediate-frequency wave signal and thus effectively of the received wave signal. This means comprises a wave-signal generator 26 of conventional circuit arrangement having an output circuit which is coupled to an inductor 27 serially included with the inductors 13 and 21 in the anode-energizing circuit of the vacuum tube 10.

Where the superregenerative circuit is operated in the linear mode of operation, the oscillations inherently produced in the superregenerative circuit in each quench cycle are damped before attaining saturation-level amplitude. For that case, means is also provided in the wave-signal receiver for deriving the amplitude-modulation components of the derived and amplified intermediate-frequency wave signal of the superregenerative circuit. This means comprises a diode rectifier 29, having a load resistor 30, coupled through a condenser 31 across the resonant circuit 13, 14 and 15 of the superregenerative circuit. The load resistor 30 is also coupled through a radio-frequency choke coil 32 to the input circuit of an audio-frequency amplifier 33 which has an output circuit coupled to a loudspeaker 34 or other suitable device for utilizing the modulation components derived from the intermediate-frequency signal. The elements 29—32 may be dispensed with where the superregenerative circuit is operated in the logarithmic mode, it being then only necessary to couple the output circuit of the regenerator tube in conventional manner to the amplifier 33. In the logarithmic mode, the oscillations produced in each quench cycle reach saturation-level amplitude for all received signals and variations of the average anode current of the tube 10 represent the modulation components of the received signal.

In practice, the frequency of the quenching oscillator 20 is lower than that of the oscillator 26, the received wave signal, and the oscillatory frequency of the regenerative circuit. It is preferable that the quench oscillations developed across the resonant circuit 21, 22 have an amplitude larger than that of either the received wave signal or of the wave signal applied to the regenerative circuit from the oscillator 26.

Considering now the operation of the wave-signal receiver just described, and referring to the curves of Fig. 2, the low-frequency quench oscillations of the oscillator 20 and the high-frequency wave signal of the generator 26 are combined, as represented by curve A, in the anode-energizing circuit of the tube 10 and thus are applied to the regenerative circuit to control its operation. The condenser 18 and inductor 27 have values so selected that these elements, together with the condenser 22, are resonant at the frequency of the wave signal generated by the generator 26. Since the condenser 22 has a value much larger than that of the condenser 18, the wave-signal potential applied to the regenerative circuit from the generator 26 is developed primarily across the condenser 18.

During intervals when the energizing potential applied to the anode 12 of the vacuum tube 10 is low, the tube 10 operates with a nonlinear input-output characteristic. By virtue of this nonlinear characteristic, there is developed during such intervals and in the resonant circuit 13, 14 and 15 an intermediate-frequency wave signal having a frequency equal to the difference between the frequency of the wave signal of the generator 26 and that of the received wave signal applied to the regenerative circuit through the resonant circuit 23. The frequency of the generator 26 is selected, however, as previously mentioned, such that the frequency of this derived wave signal corresponds substantially to the resonant frequency of the resonant circuit 13, 14 and 15. Thus at times $t_0$ and $t_1$, Fig. 2, when the anode potential of the tube 12 is low, the nonlinear operating characteristic of the latter causes it to have maximum conversion sensitivity, as represented by curve B. The wave signal of intermediate frequency thus derived by conversion in the resonant circuit 13, 14 and 15 has an amplitude varying with time as represented by curve C, the maximum amplitude of this signal varying by reason of the converter action described with the amplitude of the received wave signal. As in conventional superregenerative circuits, the quench oscillations applied from the oscillator 20 to the regenerative circuit cause the resonant circuit 13, 14 and 15 under the control of the tube 10 to have a dynamic conductance which varies between negative and positive values, as represented by curve D. By virtue of this fact, and for reasons well known, the regenerative circuit has a sensitivity-time characteristic, as represented by curve E, exhibiting maximum sensitivity in each interval when the circuit conductance is approximately zero in the transition from a positive to a negative value.

Oscillations of intermediate frequency are initiated in the resonant circuit 13, 14 and 15 due to the regenerative action during each of the sensitive intervals, represented by curve E, and continue to increase in amplitude until the conductance, represented by curve D, of the circuit becomes positive after which the oscillations decrease in amplitude in an exponential manner with time. The manner of build-up and decay of these oscillations by virtue of the regenerative action is represented by curve F. These oscillations have an amplitude many times larger than that of the intermediate-frequency signal derived in the resonant circuit 13, 14 and 15 by conversion from the received wave signal and the wave signal of the generator 26; so much so in fact that curve C would hardly be perceptible if drawn to the same amplitude scale as curve F, so that different amplitude scales have been chosen for these curves to aid in clarity of illustration. The oscillations generated in each quench cycle due to regeneration have an initial amplitude dependent upon the amplitude of the intermediate-frequency signal derived during the period of maximum sensitivity, represented by curve E, of the regenerative circuit. There is thus effected a superregenerative amplification of the derived modulated intermediate-frequency signal and thus effectively a similar amplification of the received wave signal. In this regard it is important to note that the intermediate-frequency signal derived by conversion in the resonant circuit 13, 14, 15, and represented by curve C, has maximum amplitudes near the moments of maximum sensitivity, designated as points $e_0$ and $e_1$ on curve E, of the regenerative circuit so that the effective amplification of the received wave signal is substantially optimum. This fact gives rise to good sensitivity and good signal-to-noise ratio in a receiver embodying the present invention.

The intermediate-frequency oscillations of super-regeneration are peak-rectified by the diode rectifier 29 to derive across the load resistor 30 the amplitude-modulation components of the derived intermediate-frequency signal, which components correspond to those of the received wave signals. The derived components are applied to the audio-frequency amplifier 33 where they are suitably amplified and applied to the loudspeaker 34 for utilization.

In the operation of the wave-signal receiver, the condenser 15 and inductor 19 are tuned to series resonance at the frequency of the received wave signal to maintain the cathode 16 of tube 10 at a ground potential for wave-signal energy of this frequency to avoid degeneration. This ensures that the maximum wave-signal potential shall be impressed between the control electrode 11 and cathode 16 of tube 10, thus to develop in the tuned circuit 13, 14 and 15, by conversion, the largest amplitude intermediate-frequency signal. The elements 15 and 19 thereby effectively improve the conversion sensitivity of the receiver. In practice, the series-resonant circuit 15, 19 is usually needed only when the resonant circuit 13, 14 and 15 has a resonant frequency quite close to the frequency of the received wave signal. In the event, however, that the intermediate frequency differs substantially from the received wave-signal frequency, the inductor 19 may be dispensed with and the condenser 15 alone relied upon to maintain the cathode 16 of tube 10 at ground potential at received signal frequencies. Also, if desired, the values of the elements 15 and 19 may be selected to present a capacitive reactance at the frequency of the incoming signal. Where that is done, some regeneration at the radio frequency is introduced into the system which may be desirable to improve the selectivity and gain.

It is usually preferable that the intermediate frequency have a value widely different from the frequency of the received wave signal. Among other things, this has the advantage that the input resonant circuit 23 has low impedance at the intermediate frequency and substantially no potential of intermediate frequency can thus be developed across this circuit. No energy of intermediate frequency is then available for radiation from the antenna system 24, 25. This has the important advantage that a wave-signal receiver embodying the present invention has almost complete freedom from undesirable radiation from its antenna system even though the regenerative circuit is directly coupled to the antenna system particularly if the regenerative circuit is operated in the linear mode.

It will be apparent that the input circuit 23 of the receiver is only electronically coupled to the regenerative circuit so that the latter is quite well isolated from the antenna system 24, 25. This has the important advantage that the regenerative circuit is less loaded by the antenna-system impedance and therefore can realize higher values of negative conductance with consequent higher superregenerative gain. Additionally, this has the advantage that the superregenerative circuit possesses higher operating stability and neither the superregenerative gain nor the stability are affected by variations of the antenna impedance or loading.

The superregenerative gain of the receiver of the present invention is obtained at a fixed intermediate frequency. This has the advantage that, if the input circuit 23 and the oscillator 26 are uncontrolled to preserve a desired tracking characteristic as is customary in superheterodyne reception, the receiver may be tuned over a relatively wide range of wave-signal frequencies without any appreciable variation of superregenerative gain over this wide tuning range.

The modulation or frequency conversion introduced by the nonlinear characteristic of the tube 10, explained above, produces frequency components equal to the sum and difference frequencies of the received signal and the signal supplied by the oscillator 26. Either may be selected as the intermediate-frequency signal of the receiving system by appropriate choice of the resonant frequency of the circuit 13, 14 and 15. However, the described use of an intermediate frequency low with relation to the received wave-signal frequencies is desirable from several standpoints. For the reception of very high-frequency wave signals, a relatively low intermediate frequency enables the superregenerative circuit to operate under conditions where its maximum usable gain can more easily be attained. Further, and as a practical matter, the receiver then possesses substantially increased selectivity by virtue of the lowered regenerative or intermediate frequency which enables the use of a much lower quench frequency consistent with optimum stability of operation of the regenerative circuit.

A receiver embodying the present invention has the additional important advantage that only a single tube is used to provide both a modulator action, by which to convert the received wave signal to an intermediate-frequency signal, and a superregenerative action. In the logarithmic mode of operation of the superregenerative circuit, this single tube is enabled to perform the usual functions of the modulator or first detector, the intermediate-frequency amplifier, and the second detector of a conventional superheterodyne receiver and all of these several functions can be performed by a simple triode type of tube as in the Fig. 1 arrangement. In the linear mode of operation of the superregenerative circuit, the single tube still performs all of the functions enumerated with the exception that an additional tube is required to perform the function of the second detector.

In employing the receiver of Fig. 1 for the reception of amplitude-modulated wave signals, the resonant circuit 13, 14 and 15 is center-tuned to the derived intermediate-frequency signal. For the reception of frequency-modulated wave signals, the resonant circuit may be side-tuned to the derived intermediate-frequency signal to convert the frequency modulation of the received signal to amplitude modulation prior to superregenerative amplification in the regenerative system. In certain of the appended claims, the heterodyning signal supplied by the oscillator 26 is defined as having a frequency differing from that of the received wave signal substantially by the value of the oscillatory frequency of the superregenerative circuit. That definition is used in a generic sense to mean center tuning of the resonant circuit 13, 14 and 15 for the reception of amplitude-modulated signals as well as side tuning for the reception of frequency-modulated signals. For example, in receiving a frequency-modulated carrier-wave signal having maximum frequency deviations of ±75 kilocycles, the resonant circuit is tuned off the mean intermediate frequency by about 100 kilocycles to obtain optimum results. In such a case, the mean intermediate frequency may be of the order of 20 megacycles. Thus, in referring to a first or heterodyne wave-signal frequency differing from that of a second or received wave-signal frequency substantially by the value of the free oscillation frequency, it is meant that the frequency difference of the first and second frequencies lies within a frequency range defined by the free oscillation frequency plus or minus a frequency of the order of the modulation side band of the received wave signal.

It will be apparent from the foregoing description that the superregenerative receiver of Fig. 1 comprises a regenerative system, including the tube 10 and including a received wave-signal input circuit shown as the radio-frequency selector 23. During at least the start of any oscillatory build-up interval, the regenerative system has a nonlinear operating characteristic effective to derive in some circuit portion of the system, such as the output circuit of the tube 10, and from the received signal a wave signal having a frequency different from that of the received signal. In particular, an intermediate-frequency signal is derived in the output circuit of the tube 10. The value of the intermediate frequency is widely different from the mean frequency of the received signal, preferably representing a frequency ratio of at least 1:2, so that the intermediate frequency falls outside of the acceptance band of the selector 23, thereby to minimize undesired re-radiation from the regenerative system. The resonant circuit 13, 14 and 15 is substantially tuned to the frequency of the derived signal and is included in the output circuit of the tube 10 for establishing the free oscillation frequency of the system. Here, again, the expression "substantially tuned to the frequency of the derived signal" is used in a generic sense to include center tuning for the reception of amplitude-modulated signals and side tuning for the reception of frequency-modulated signals as previously explained. The receiver further includes quenching means for effecting alternate oscillation build-up and oscillation decay intervals in the regenerative system to provide superregenerative amplification of the derived signal and thus effectively of the received signal.

Fig. 3 is a circuit diagram, partly schematic, of a complete superregenerative superheterodyne receiver embodying the present invention in a modified form which is essentially similar to that of Fig. 1, similar elements being designated by similar reference numerals. The present arrangement differs from that of Fig. 1 in regard to the manner of applying the quench oscillations and the locally generated wave signal to the regenerative circuit. The output circuit of the quench oscillator 20 is here coupled to the anode circuit of the generator 26 which in the present arrangement generates a wave signal of much larger amplitude than in the arrangement of Fig. 1. The quench-frequency oscillations of the oscillator 20 amplitude-modulate the latter to at least 100% modulation. This modulated wave signal is coupled through the inductor 27 to the regenerator tube to provide the superregenerative operation previously described and to develop from the received wave signal an intermediate-frequency signal in the manner previously mentioned. While in the present arrangement there is applied to the anode 12 of tube 10 only an alternating-current energizing potential, the superregenerative circuit nevertheless is enabled to oscillate at the lower intermediate frequency by virtue of the half-wave rectification provided by the regenerator tube 10 which thus draws an average value of plate current much as though it were energized from a source of unidirectional potential. The operation of this modified form of the invention is otherwise essentially similar to that of Fig. 1 and will not be repeated.

An additional modified form of the invention is shown by the circuit diagram of Fig. 4, this modification being essentially similar to that of Fig. 1 and similar circuit elements being designated by similar reference numerals. The present arrangement differs from that of Fig. 1 in that the former includes a blocking oscillator 41 of conventional construction for generating repeated pulses of wave-signal energy having a frequency differing from that of the received wave signal by substantially the value of the desired intermediate frequency. The present arrangement also includes means for deriving from the blocking oscillator 41 quench oscillations of a frequency equal to the pulse-repetition frequency of the repeating pulses of wave-signal energy. The quench oscillations are utilized to effect superregenerative operation of the regenerative circuit. This means comprises a resistor 42 and shunt-connected condenser 43 included in the cathode circuit of the vacuum tube of oscillator 41 for the purpose of deriving across the cathode resistor 42 quench oscillations approximately of saw-tooth wave form. These oscillations are applied through a resistor 44 and a radio-frequency choke coil 45 to the control electrode 11 of the regenerator tube 10.

The cathode circuit of the tube 10 includes a cathode resistor 46 which is coupled through a bleeder resistor 47 to a source of anode potential, indicated as +B, which energizes the anode 12 of tube 10 through the inductor 13. The pulses of wave-signal energy generated by the oscillator 41 are applied through a small condenser 48 to the control electrode 11 of the regenerator tube 10. The relative values of the resistors 46 and 47 are so selected that the vacuum tube 10 is biased to anode-current cutoff except during each interval when the saw-tooth voltage developed across the cathode resistor 42 exceeds a selected voltage value. Normal superregenerative amplification is effected during each such interval.

The quench oscillations derived from the blocking oscillator 41 inherently have such phase that the maximum sensitivity of the superregenerative circuit occurs during each interval when a pulse of wave-signal energy is generated by the oscillator 41. Thus, the intermediate-frequency wave signal is derived by conversion in the resonant circuit 13, 14 and 15 in the manner described in connection with Fig. 1. On the other hand, the maximum amplitude of the oscillations resulting from the superregenerative action occurs during intervals when the oscillator 41 is blocked and is generating no wave-signal energy. As a consequence, it is not possible for any such oscillations of appreciable amplitude to combine with the wave signal of the oscillator 41 to develop a wave signal of a frequency equal to that of the received wave signal and subject to radiation from the antenna system of the receiver. The cathode-circuit elements 15 and 19 may, however, be desirable for the reasons explained in connection with Fig. 1; namely, to maintain the cathode 16 at ground potential for received signal frequencies in order to attain maximum conversion of the received wave signal to the intermediate frequency by impressing maximum signal potential between the control electrode 11 and cathode 16 of tube 10.

It will be apparent from the foregoing description of the Fig. 4 arrangement that the single oscillator 41, which may be a simple triode type of tube, performs the combined functions of a beat-frequency oscillator and a quench oscillator. Thus when the regenerative circuit is operated in the logarithmic mode, a duo-triode type of tube is enabled to perform the combined functions of the modulator or first detector, the beat-frequency oscillator, the intermediate-frequency amplifier, and the second detector of a conventional superheterodyne type of receiver and in addition is enabled to perform the function of a quench oscillator in a super-regenerative receiver. Linear mode of operation merely requires the use of a second tube to perform the function of the second detector.

A superregenerative superheterodyne wave-signal receiver adapted to receive angular-velocity-modulated wave signals, for example frequency-modulated wave signals, is shown by the circuit diagram of Fig. 5. This modified form of the invention is essentially similar to that of Fig. 4 and similar circuit elements are designated by similar reference numerals with analogous elements designated by similar reference numerals primed. Two regenerative circuits are employed in the present arrangement, these circuits having individual oscillatory frequencies spaced on individual sides of a given intermediate frequency. One of these circuits includes the vacuum tube 10' having input electrodes 11, 16 and a screen electrode 12', which effectively serves as an anode, coupled to a resonant circuit 13, 14 and 15 which is resonant on one side of the given intermediate frequency. The other regenerative circuit includes a tube 10a' having input electrodes 11a, 16a and a screen electrode 12a' coupled to a resonant circuit 13a, 14a and 15a which is resonant at a frequency equally spaced on the other side of the given intermediate frequency. The input electrodes 11, 16 and 11a, 16a of the respective tubes 10' and 10a' are coupled in common to the input resonant circuit 23 and to the blocking oscillator 41 as in the Fig. 4 arrangement.

The anode electrodes 12 and 12a of the respective tubes 10' and 10a' are coupled to opposite terminals of a primary winding 50 of an output transformer 51, the transformer having a secondary winding 52 coupled to the loudspeaker 34. The magnitude of the positive energizing potential applied to the screen electrodes 12' and 12a' is conveniently controlled by an adjustable voltage divider 53. The cathode resistor 46' of the tubes 10' and 10a' is in the form of a potentiometer having a movable contact 54 connected to ground, it being the purpose of the potentiometer 46' to effect balanced operation of the two regenerative circuits.

The quench oscillations of saw-tooth wave form developed across the cathode resistor 42 of the blocking oscillator 41 have their wave form somewhat degenerated by the use of a filter network comprising a series-arm resistor 55 followed by a shunt-arm resistor 56 connected in series with a condenser 57. It is the purpose of this wave shaping to effect a logarithmic mode of operation of the superregenerator tubes and to obtain a superregenerative frequency-response characteristic for the resonant circuits 13, 14, 15 and 13a, 14a and 15a such as to correspond to a probability function. This ensures that the receiver is not substantially responsive to amplitude variations of a received wave signal and assures linearity of the input-output characteristic of the superregenerative circuit as disclosed and claimed in applicant's copending application entitled "Wave-Signal Receiver," Serial No. 655,458, filed March 19, 1946, Patent No. 2,577,781, granted December 11, 1951, and assigned to the same assignee as the present application.

The operation of the last-described embodiment of the invention is essentially similar to that of Figs. 1 and 4. Considering briefly the operation of the Fig. 5 receiver, and referring to the curves of Fig. 6 the wave signal generated by the blocking oscillator 41 has an amplitude characteristic represented by curve H. The nonlinear operating characteristics of the tubes 10' and 10a' thus cause each of the regenerative circuits to have a conversion sensitivity as represented by Curve I. There is thus developed by conversion in the resonant circuits 13, 14, 15 and 13a, 14a and 15a intermediate-frequency signals having amplitudes varying in opposite senses with the frequency deviation of the received wave signal from its mean frequency, this oppositely varying amplitude characteristic being due to the side tuning of the resonant circuits from the given intermediate frequency. The amplitude characteristic of the intermediate-frequency signal for one of the resonant circuits is represented by curve J.

The pulses of anode current drawn by the oscillator 41 during each of its oscillatory periods is integrated by the cathode-circuit elements 42, 43 to develop thereacross quench oscillations of saw-tooth wave form, as represented by curve K. The filter elements 55, 56 and 57 modify the wave form of these quench oscillations to provide across the filter elements 56, 57 quench oscillations having a wave form, represented by curve L, to effect a logarithmic mode of operation of the superregenerator tubes and to obtain a superregenerative frequency-response characteristic for the resonant circuits 13, 14, 15 and 13a, 14a and 15a corresponding to a probability function, as earlier mentioned. The resultant conductance characteristic of the superregenerators is represented by curve M. This conductance characteristic causes the superregenerative circuits to have an intermediate-frequency sensitivity characteristic as represented by curve N. The manner of build-up and decay of the intermediate-frequency oscillations by virtue of the superregenerative action is represented by curve O. Since the tubes 10' and 10a' operate in the logarithmic mode of operation, the average anode currents of these tubes vary with the amplitude of the derived and superregeneratively amplified intermediate-frequency signal. The outputs of the tubes 10' and 10a' are differentially combined by the transformer 51 so that the frequency-modulation components of the received wave signal are developed in the combined output circuit of these tubes and are applied to the loudspeaker 34 for reproduction. This arrangement affords a pronounced improvement with respect to impulse noise which may be troublesome in prior frequency-modulation receivers. Impulse noise is considered to be man-made noise and usually it is more disturbing than random noise because of its greater energy content. The improvement relative to impulse noise results from the fact that such noise is able to influence the superregenerative circuit only during the very short sensitive period of that circuit in each quench cycle.

The wave-shaping filter network 55, 56 and 57 utilized in the Fig. 5 arrangement may, if desired, be similarly used in the Fig. 4 receiver by which to obtain a desired character of operation of the superregenerative circuit thereof and to attain a desired selectivity characteristic for the receiver.

Each of the superregenerative superheterodyne wave-signal receivers thus far described features the use of an externally quenched superregenerative circuit; that is, a superregenerative circuit to which a quench signal is applied from an external source. However, the invention is not limited in that respect and may, if desired, be adapted to receivers in which the superregenerative circuit is of the self-quenching type. Such an embodiment of the invention is represented in the arrangement of Fig. 7 which is generally similar to that of Fig. 1, corresponding components thereof being identified by similar reference characters. The regenerative system includes a triode vacuum tube 110 and is adapted to translate a received wave signal intercepted by the antenna system 124, 125 and applied to the input electrodes of the tube 110 by way of a tunable radio-frequency selector 123. The input selector 123 comprises an inductor 160, an adjustably fixed trimmer condenser 161 and a tuning condenser 162. One terminal of the selector is grounded and the opposite terminal is coupled through a condenser 163 to the control electrode of the tube 110.

The free oscillation frequency of the regenerative system is again determined by a resonant circuit comprising a variable inductor 113 and condensers 114, 115, and 118. A damping resistor 164 is included in the resonant circuit to provide adequate positive damping within the regenerative system during each positive conductance period. One terminal of the resonant circuit is connected to the anode of the tube 110, while the opposite terminal is coupled to the control electrode through the condenser 118, a radio-frequency choke 165 and a resistor 166. The cathode of the tube is connected to the junction of condensers 114 and 115 to complete the regenerative system. The resistor 166 is utilized to suppress parasitic oscillations in the control-electrode circuit of the tube. The control electrode is also coupled through a resistor 167 to a source of unidirectional potential, indicated as +B, which energizes the anode of the tube 110. This source is decoupled from the regenerative system by a by-pass condenser 168 and a decoupling resistor 169.

The regenerative system further comprises self-quenching means for controlling the conductance variations thereof to cause the system to have alternate oscillation build-up and oscillation decay intervals characteristic of superregenerative amplification. Although the self-quenching arrangement may be variously included in the anode, control-electrode, or cathode circuits of the tube 110, the latter arrangement is represented in the drawing. To effect self-quenching there is provided a condenser 170 and a resistor 171 having a common terminal coupled to the cathode of the tube 110 through a radio-frequency choke 172. The condenser 170 is coupled through a condenser 176 across the resistor 171 and the junction of the condensers 170 and 176 is coupled through the components 165 and 166 to the control electrode of the tube 110. There is also included in the cathode circuit an impedance 173 and potential variations developed thereacross are supplied through a filter to the audio-frequency amplifier 133, the filter comprising a series resistor 174 and a shunt condenser 175. The condenser 176 in conjunction with the impedance 173 constitutes a cathode stabilizing network of the type described in applicant's copending application Serial No. 753,236, filed June 7, 1947, entitled "Superregenerative Receiver" and assigned to the same assignee as the present invention. The return of the control electrode to the positive potential source +B in conjunction with the resistor 167 and the condenser 176 also affords grid-circuit stabilization which is the predominant stabilizing effect utilized. Grid-circuit stabilization of this type is fully described and claimed in a copending application of Donald Richman, Serial No. 788,765, filed November 28, 1947, entitled "Self-Quench Superregenerative Receiver" and assigned to the same assignee as the present invention. The condenser 177 is a by-pass condenser.

The oscillator 126 for supplying a heterodyne signal includes a triode tube 180 and a frequency-determining circuit. The frequency-determining circuit is provided by an inductor 181, a trimmer condenser 182 and a tuning condenser 183. The condenser 183 is unicontrolled with the tuning condenser 162 of input selector 123, as indicated by the broken construction line 184, to accomplish tracking as in conventional heterodyning practice. One terminal of the frequency-determining circuit is coupled through a condenser 185 to the control electrode of the tube 180 while the other terminal is coupled by way of a condenser 186 and a radio-frequency choke 187 to the cathode. A grid-leak resistor 188 is connected between the grid and cathode of the tube and a condenser 189 couples the anode thereof to the frequency-determining circuit. The anode is coupled to a unidirectional potential source +B by way of a resistor 190. The heterodyne signal generated by the oscillator 126 is applied through a coupling condenser 191 to the input circuit of the regenerator tube 110.

If the arrangement of Fig. 7 be considered momentarily to include a separate quench oscillator, as distinguished from a self-quenched superregenerative circuit, it operates in essentially the same manner as the arrangement of Fig. 1 in translating a received wave signal. Briefly, the nonlinear translating characteristics of the tube 110 during at least the start of each oscillatory build-up interval effects a heterodyning of the received wave signal selected by the input selector 123 and the locally generated signal supplied by the oscillator 126. The intermediate-frequency signal is derived in the output circuit of the tube 110. The resonant circuit 113, 114, and 115 which is included in the output circuit of the tube responds to the intermediate-frequency signal. As the conductance of the regenerative system is varied alternately between negative and positive values, the derived intermediate-frequency signal is subjected to superregenerative amplication. This amplification causes variations in the anode-cathode current of the tube 110 which variations represent the modulation components of the received signal. Signal potentials are developed across the cathode load impedance 173 which manifest variations in the anode-cathode current and, therefore, correspond with the modulation components of the received signal. Such potential variations are supplied through the filter 174, 175 to the audio-frequency amplifier 133 for amplification and reproduction.

Considering now more particularly the self-quenching phenomena, it is apparent that an energizing-potential source +B is conductively connected to the anode-cathode circuit of the regenerative tube 110. In the absence of a biasing potential, to be considered presently, this energizing potential permits oscillations to be generated in the regenerative system. During any oscillatory interval, the direct-current component of the anode-cathode current of the regenerator tube 110 charges the condenser 170 in the cathode circuit. As a charge is accumulated on that condenser, the effective negative bias potential between the control and cathode electrodes is increased until ultimately the bias potential developed by the condenser 170 biases the tube to anode-current cutoff and initiates an oscillation decay or a positive conductance interval. As the charge accumulated by the condenser 170 is dissipated in the resistor 171, the bias potential is reduced. When it has fallen to a sufficiently low value, the regenerator tube 110 is again rendered conductive, thus terminating the positive conductance interval and initiating the negative conductance or oscillation build-up interval. In this fashion, the regenerative circuit is self-controlled to exhibit a conductance characteristic to provide superregenerative action.

For the reception of amplitude-modulated signals the resonant circuit 113, 114, and 115 is center-tuned to the derived intermediate-frequency signal resulting from the heterodyning of the radio frequency selected by the input selector 123 and the locally generated signal supplied by the oscillator 126. To achieve reception of a frequency-modulated signal, the resonant circuit 113, 114 and 115 is side-tuned to the derived intermediate-frequency signal as above explained and for both cases the superregenerative action is of the saturation or logarithmic mode.

By way of illustration, one receiving arrangement of the type shown in Fig. 7 and found to have practical application for the reception of frequency-modulated signals utilized the following circuit-element values:

*Regenerative system*

| | |
|---|---|
| Tube 110 | ½ of a type 12AT7 tube |
| Resistor 164 | 15,000 ohms |
| Resistor 166 | 10 ohms |
| Resistor 167 | 150,000 ohms |
| Resistor 169 | 1,000 ohms |
| Resistor 171 | 1,500 ohms |
| Resistor 173 | 22,000 ohms |
| Resistor 174 | 100,000 ohms |
| Condenser 114 | 30 micromicrofarads |
| Condenser 115 | 30 micromicrofarads |
| Condenser 118 | 5000 micromicrofarads |
| Condenser 161 | 3–12 micromicrofarads |
| Condenser 163 | 500 micromicrofarads |
| Condenser 168 | 40 microfarads |
| Condenser 170 | 2,500 micromicrofarads |
| Condenser 175 | 1,000 micromicrofarads |
| Condenser 176 | 10 microfarads |
| Condenser 177 | 5,000 micromicrofarads |
| Condenser 191 | 2 micromicrofarads |
| Resonant frequency of circuit 113, 114 and 115 | 21.75 megacycles |
| Value of +B | 100 volts |
| Tuning range of selector 123 | 88–108 megacycles |
| Approximate quench frequency | 30 kilocycles |

*Heterodyne oscillator 126*

| | |
|---|---|
| Tube 180 | ½ of a type 12AT7 tube |
| Resistor 188 | 22,000 ohms |
| Resistor 190 | 100 ohms |
| Condenser 182 | 4–25 micromicrofarads |
| Condenser 185 | 20 micromicrofarads |
| Condenser 186 | 500 micromicrofarads |
| Condenser 189 | 500 micromicrofarads |
| Tuning range | 109.75–129.75 megacycles |

Since the regenerative circuit in receiver arrangements of the type utilizing the present invention exhibits a nonlinear translating characteristic during oscillatory build-up intervals, that characteristic may be relied upon to accomplish a heterodyning action in which case the superregenerative amplification occurs at an intermediate frequency as previously described. However, substantial benefits of the invention may be realized without the heterodyning step because the nonlinear characteristic causes the regenerative system to be in the nature of a harmonic generator, capable of supplying to its output circuit a wave signal derived from the received wave signal and having a frequency which is harmonically related to that of the received signal. The modification of Fig. 8 represents a receiver in which superregenerative amplification of the derived harmonic signal is featured. This arrangement is very similar to that of Fg. 1 and corresponding components thereof are identified by the same reference characters. One significant difference in the two wave-signal receivers is that the Fig. 8 modification does not include the heterodyning generator 26 of the Fig. 1 embodiment. Another essential difference is that the resonant circuit 13, 14 and 15 in the embodiment of Fig. 8 is tuned to be responsive to a desired harmonic of the received wave signal, which harmonic is developed in the output circuit of the regenerator tube 10. For example, the resonant circuit may be adjusted to respond to the third harmonic of the received signal.

In the operation of the Fig. 8 arrangement, a received wave signal is translated by the regenerator tube 10. The nonlinear characteristic of that tube causes signals to be supplied to its output circuit corresponding to harmonics of the received wave signal and having modulation components in accordance with the modulation of the received wave signal. The superregenerative action of the regenerative circuit under the control of the quench-frequency oscillator 20 and the selected resonant frequency of the circuit 13, 14 and 15 permit superregenerative amplification of a selected one of the derived harmonic wave signals. The detector 29 detects the modulation components of the amplified harmonic wave signal for further amplification and utilization by the audio-frequency system 33, 34.

Arrangements of the type represented by Fig. 8 are especially free from re-radiation problems which have heretofore been exceedingly troublesome in prior conventional superregenerative receivers. When the superregenerative amplification occurs at a harmonic of the received wave signal, in the manner described, the free oscillating frequency of the regenerative system is so different from the resonant frequency of the input selector 23 that the latter exhibits a very low impedance to the oscillations periodically generated in the regenerative circuit. For that reason the potential developed by the input selector 23 in response to the intermittent oscillations inherent in the superregenerative action is so small that re-radiation is unappreciable.

It will be apparent from the foregoing description of the invention that a wave-signal receiver embodying the invention provides exceptionally high amplification of a received wave signal, has improved selectivity and stability characteristics, is not subject to radiation of wave-signal energy from its antenna system, and yet is of simple and inexpensive construction. Additionally, in a receiver of the superregenerative superheterodyne type embodying the invention and utilizing a relatively low intermediate frequency, a superregenerative circuit may be utilized to receive very high-frequency wave signals while at the same time easily attaining the maximum usable gain of the superregenerative circuit. The present invention, as utilized in that type of receiver, has the additional advantages that the superregenerative circuit is operated at a fixed intermediate frequency so that the receiver may be tuned over a relatively wide range of wave-signal frequencies without any substantial variation of the superregenerative gain. The superregenerative gain and stability of the superregenerative circuit also do not vary with antenna impedance or antenna loading such as characterizes conventional superregenerative receivers. There is the additional important advantage of the present invention that a single tube of the simple triode type may, as hereinbefore mentioned, perform numerous functions of tandem-arranged stages of a conventional superheterodyne receiver, thus to effect a substantial simplification and increased compactness of this type of receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative superheterodyne wave-signal receiver comprising: a superregenerative circuit including a regenerative oscillatory circuit having parameters so proportioned as to provide therefor a free oscillation frequency differing substantially from the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; means for applying said received wave signal to said regenerative oscillatory circuit; and heterodyne signal-supply means coupled to said regenerative oscillatory circuit and having parameters so proportioned as to apply to said regenerative oscillatory circuit a wave signal having a frequency differing from that of said received wave signal substantially by the value of said free oscillation frequency to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

2. A superregenerative superheterodyne wave-signal receiver comprising: a superregenerative circuit including a regenerative oscillatory circuit having parameters so proportioned as to provide therefor a free oscillation frequency substantially lower than the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; means for applying said received wave signal to said regenerative oscillatory circuit; and heterodyne signal-supply means coupled to said regenerative oscillatory circuit and having parameters so proportioned as to apply to said regenerative oscillatory circuit a wave signal having a frequency differing from that of said received wave signal substantially by the value of said free oscillation frequency to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

3. A superregenerative superheterodyne wave-signal receiver comprising: a self-quenching superregenerative circuit including a regenerative oscillatory circuit having parameters so proportioned as to provide therefor a free oscillation frequency differing substantially from the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; means for applying said received wave signal to said regenerative oscillatory circuit; and heterodyne signal-supply means coupled to said regenerative oscillatory circuit and having parameters so proportioned as to apply to said regenerative oscillatory circuit a wave signal having a frequency differing from that of said received wave signal substantially by the value of said free oscillation frequency to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

4. A superregenerative superheterodyne wave-signal receiver comprising: a regenerative oscillatory circuit having parameters so proportioned as to provide therefor a free oscillation frequency differing substantially from the frequency of a received wave signal to be applied thereto; means for applying said received wave signal to said circuit; means for introducing into said circuit a wave signal for developing therein a heterodyning wave signal having a frequency differing from that of said received wave signal substantially by the value of said free oscillation frequency; and means for quenching said regenerative circuit to develop therein from said received signal and said heterodyning signal a wave signal having substantially said free oscillation frequency and to provide superregenerative amplification of said developed wave signal, thereby effectively to provide superregenerative amplification of said received wave signal.

5. A superregenerative superheterodyne wave-signal receiver comprising: a regenerative oscillatory circuit having parameters so proportioned as to provide therefor a free oscillation frequency differing substantially from the frequency of a received wave signal to be applied thereto; means for applying said received wave signal to said circuit; heterodyne signal-supply means coupled to said circuit and having parameters so proportioned as to apply to said circuit a wave signal having a frequency differing from that of said received wave signal substantially by the value of said free oscillation frequency; and means for generating quench oscillations having an amplitude larger than that of either of said applied wave signals and for utilizing said quench oscillations to quench said regenerative circuit to develop therein from said applied wave signals a wave signal having substantially said free oscillation frequency and to provide superregenerative amplification of said developed wave signal, thereby effectively to provide superregenerative amplification of said received wave signal.

6. A superregenerative superheterodyne wave-signal receiver comprising: a regenerative oscillatory circuit having parameters so proportioned as to provide therefor a free oscillation frequency differing substantially from the frequency of a received wave signal to be applied thereto; means for applying said received wave signal to said circuit; means coupled to said circuit and having parameters so proportioned as to generate repeated pulses of wave-signal energy having a frequency differing from that of said received wave signal substantially by the value of said free oscillation frequency and to apply said generated wave signal to said circuit; and means for quenching said regenerative circuit in timed relation to the generation of said pulses of wave-signal energy to develop in said circuit from said applied wave signals a wave signal having substantially said free oscillation frequency and to provide superregenerative amplification of said developed wave signal, thereby effectively to provide superregenerative amplification of said received wave signal.

7. A superregenerative superheterodyne wave-signal receiver comprising, a superregenerative circuit including a regenerative oscillatory circuit having parameters so proportioned as to provide therefor a free oscillation frequency differing substantially from the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; said regenerative oscillatory circuit having during any oscillatory build-up interval a nonlinear translating characteristic; means for applying said received wave signal to said regenerative oscillatory circuit; and heterodyne signal-supply means coupled to said regenerative oscillatory circuit and having parameters so proportioned as to apply to said regenerative oscillatory circuit during at least the start of each of said oscillatory build-up intervals a wave signal having a frequency differing from that of said received wave signal substantially by the value of said free oscillation frequency for causing said nonlinear characteristic to derive in said regenerative oscillatory circuit from said received wave signal and said heterodyne wave signal a wave signal having substantially said free oscillation frequency, whereby said superregenerative circuit provides superregenerative amplification of said derived signal and thus effectively of said received wave signal.

8. A superregenerative superheterodyne wave-signal receiver comprising: a superregenerative circuit including a regenerative oscillatory circuit having parameters so proportioned as to provide therefor a free oscillation frequency differing substantially from the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; said regenerative oscillatory circuit having during any oscillatory build-up interval a nonlinear translating characteristic; means for applying said received wave signal to said regenerative oscillatory circuit; and heterodyne signal-supply means coupled to said regenerative oscillatory circuit and having parameters so proportioned as to apply to said regenerative oscillatory circuit, during spaced intervals which partially overlap but terminate early in said oscillatory build-up intervals, a wave signal having a frequency differing from that of said received wave signal substantially by the value of said free oscillation frequency for causing said nonlinear characteristic to derive in said regenerative oscillatory circuit from said received wave signal and heterodyne wave signal a wave signal having substantially said free oscillation frequency, whereby said superregenerative circuit provides superregenerative amplification of said derived wave signal and thus effectively of said received wave signal.

9. A superregenerative superheterodyne wave-signal receiver comprising: a regenerative oscillatory circuit having parameters so proportioned as to provide therefor a free oscillation frequency differing substantially from the frequency of a received wave signal to be applied thereto; means for applying said received wave signal to said circuit; a blocking oscillator coupled to said circuit and having parameters so proportioned as to generate repeated pulses of wave-signal energy having a frequency differing from that of said received wave signal substantially by the value of said free oscillation frequency and to apply said generated wave signal to said circuit; and means for deriving from said blocking oscillator quench oscillations and for utilizing said quench oscillations to quench said regenerative circuit in timed relation to the generation of said pulses of wave-signal energy to develop in said circuit from said applied wave signals a wave signal having substantially said free oscillation frequency and to provide superregenerative amplification of said derived wave signal, thereby effectively to provide superregenerative amplification of said received wave signal.

10. A superregenerative superheterodyne wave-signal receiver comprising: a regenerative oscillatory circuit having parameters so proportioned as to provide therefor a free oscillation frequency differing substantially from the frequency of a received wave signal to be applied thereto and including a single regenerator tube; means for applying said received wave signal to said circuit; means for periodically quenching said circuit to provide superregeneration; said regenerator tube having a nonlinear operating characteristic during at least one interval of each quench cycle; and heterodyne signal-supply means coupled to said circuit and having parameters so proportioned as to apply to said circuit a wave signal having a frequency differing from that of said received wave signal substantially by the value of said free oscillation frequency, whereby said nonlinear operating characteristic of said regenerator tube is effective to derive in said circuit from said received wave signal and said heterodyne wave signal a wave signal having substantially said free oscillation frequency and said circuit is effective to provide superregenerative amplification of said derived wave signal and thus effectively of said received wave signal.

11. A superregenerative superheterodyne wave-signal receiver comprising: a pair of superregenerative circuits including a pair of regenerative oscillatory circuits having parameters so proportioned as to provide therefor individual free oscillation frequencies substantially equal to a given frequency but spaced by small amounts on individual sides thereof, said free oscillation frequencies and said given frequency differing substantially from the frequency of a received wave signal to be applied to said regenerative oscillatory circuits and including means for periodically quenching said regenerative oscillatory circuits to provide superregeneration; means for applying said received wave signal to said regenerative oscillatory circuits; heterodyne signal-supply means coupled to said regenerative oscillatory circuits and having parameters so proportioned as to apply to said regenerative oscillatory circuits a wave signal having a frequency differing from that of said received wave signal substantially by the value of said given frequency to derive in each of said regenerative oscillatory circuits from said applied wave signals individual wave signals having amplitudes varying in opposite senses with the deviation of the frequency of said applied wave signal on either side of a given value of wave-signal frequency, thereby to effect superregenerative amplification of said derived wave signals and thus effectively of said received wave signal; and means for combining signal outputs from said regenerative oscillatory circuits to develop a signal having an amplitude and polarity varying respectively with the extent and sense of deviation of said applied wave signal from said given value of wave-signal frequency.

12. A superregenerative superheterodyne wave-signal receiver comprising: a pair of regenerative oscillatory circuits having parameters so proportioned as to provide therefor individual free oscillation frequencies substantially equal to a given frequency but spaced by small amounts on individual sides thereof, said free oscillation frequencies and said given frequency differing substantially from the frequency of a received wave signal to be applied to said circuits; means for applying said received wave signal to said circuits; heterodyne signal-supply means coupled to said circuits and having parameters so proportioned as to generate repeated pulses of wave-signal energy having a frequency differing from that of said received wave signal substantially by the value of said given frequency and to apply said generated wave signal to said circuits; means for deriving from said last-mentioned means quench oscillations having an amplitude and wave form effective to cause an approximately logarithmic mode of operation of said regenerative circuits and to cause said circuits each to have a superregenerative frequency-response characteristic approximately in accordance with similar predetermined probability functions; means for applying said quench oscillations to said regenerative circuits to develop therein from said applied wave signals individual wave signals having amplitudes varying in opposite senses with the deviation of the frequency of said received wave signal on either side of a given value of wave-signal frequency, thereby to effect superregenerative amplification of said developed wave signals and thus effectively of said received wave signal; and means for differentially combining signal outputs from said circuits to derive a signal having an amplitude varying approximately linearly with the frequency deviation of said received wave signal from said given value of wave-signal frequency and substantially independent of the intensity of said received wave signal.

13. A superregenerative superheterodyne wave-signal receiver comprising: a superregenerative circuit including a regenerative oscillatory circuit having parameters so proportioned as to provide therefor a free oscillation frequency differing substantially from the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; said regenerative oscillatory circuit having during any oscillatory build-up interval a nonlinear translating characteristic and including a single regenerator tube having input electrodes; an input selector coupled to said input electrodes for applying said received wave signal to said regenerative oscillatory circuit; and a heterodyning oscillator coupled to said input electrodes and having parameters so proportioned as to apply to said regenerative oscillatory circuit a heterodyning signal having a frequency differing from that of said received wave signal substantially by the value of said free oscillation frequency for causing said nonlinear characteristic to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

14. A superregenerative superheterodyne wave-signal receiver comprising: a self-quenching superregenerative circuit including a regenerative oscillatory circuit having parameters so proportioned as to provide therefor a free oscillation frequency differing substantially from the frequency of a received wave signal to be applied thereto and having during any oscillatory build-up interval a non-linear translating characteristic, said regenerative oscillatory circuit including a single regenerator tube having anode, cathode and control electrodes and further including a condenser coupled between two of said electrodes to effect periodic conductance variations in said regenerative oscillatory circuit; an input selector coupled to said cathode and control electrodes for applying said received wave signal to said regenerative oscillatory circuit; and a heterodyning oscillator coupled to said regenerative oscillatory circuit and having parameters so proportioned as to apply thereto a heterodyning signal having a frequency differing from that of said received wave signal substantially by the value of said free oscillation frequency for causing said nonlinear characteristic to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

15. A superregenerative superheterodyne wave-signal receiver comprising: a self-quenching superregenerative circuit including a regenerative oscillatory circuit having parameters so proportioned as to provide therefor a free oscillation frequency differing substantially from the frequency of a received wave signal to be applied thereto and having during any oscillatory build-up interval a non-linear translating characteristic, said regenerative oscillatory circuit including a single regenerator tube having anode, cathode and control electrodes and further including a quenching network coupled between said cathode and control electrodes to effect periodic conductance variations in said regenerative oscillatory circuit; an input selector coupled to said cathode and control electrodes for applying said received wave signal to said regenerative oscillatory circuit; and a heterodyning oscillator coupled to said regenerative oscillatory circuit and having parameters so proportioned as to apply thereto a heterodyning signal having a frequency differing from that of said received wave signal substantially by the value of said free oscillation frequency for causing said nonlinear characteristic to derive in said regenerative oscillatory circuit from said received wave signal and said heterodyne wave signal a wave signal having substantially said free oscillation frequency, whereby said superregenerative circuit provides superregenerative amplification of said derived wave signal and thus effectively of said received wave signal.

16. A superregenerative superheterodyne wave-signal receiver comprising: a self-quenching superregenerative circuit including a regenerative oscillatory circuit having parameters so proportioned as to provide therefor a free oscillation frequency which is substantially less than the frequency of a received wave signal to be applied thereto and including means for effecting alternate oscillation build-up and oscillation decay intervals in said regenerative oscillatory circuit, thereby to effect superregenerative amplification of wave signals having substantially said free oscillation frequency; said regenerative oscillatory circuit having during any oscillatory build-up interval a nonlinear translating characteristic; an input selector, having a substantial response over a predetermined frequency acceptance band spaced in the frequency spectrum from said oscillatory frequency, for applying said received wave signal to said regenerative oscillatory circuit; and a heterodyning oscillator coupled to said regenerative oscillatory circuit and having parameters so proportioned as to apply thereto a heterodyning signal having a frequency differing from that of said received wave signal substantially by the value of said free oscillation frequency so that said nonlinear characteristic is effective to derive in said regenerative oscillatory circuit from said received wave signal and said heterodyne wave signal a wave signal having substantially said free oscillation frequency, thereby to effect superregenerative amplification of said derived wave signal and thus effectively of said received wave signal.

17. A superregenerative superheterodyne wave-signal receiver comprising: a superregenerative circuit having a saturation-level mode of operation, including a regenerative oscillatory circuit having parameters so proportioned as to provide therefor a free oscillation frequency differing substantially from the frequency of a received modulated wave signal to be applied thereto and including means for effecting alternate oscillation build-up and oscillation decay intervals in said regenerative oscillatory circuit, thereby to effect superregenerative amplification of wave signals having substantially said free oscillation frequency; said regenerative oscillatory circuit having during any oscillatory build-up interval a nonlinear translating characteristic and including a single regenerator tube having anode and cathode electrodes; an input selector for applying said received wave signal to said regenerative oscillatory circuit; a heterodyning oscillator coupled to said regenerative oscillatory circuit and having parameters so proportioned as to apply thereto a heterodyning signal having a frequency differing from that of said received wave signal substantially by the value of said free oscillation frequency for causing said nonlinear characteristic to derive in said regenerative oscillatory circuit from said received wave signal and said heterodyne wave signal a wave signal having substantially said free oscillation frequency and amplitude-modulated in accordance with the modulation of said received wave signal; and a load impedance included in circuit with said anode and cathode and responsive to variations in the average anode-cathode current of said tube to develop signal potentials representing the modulation components of said received wave signal.

BERNARD D. LOUGHLIN.

REFERENCES CITED

The following references are of record in the file of this patent:

UNITED STATES PATENTS

| Number | Name | Date |
|---|---|---|
| 1,539,822 | Armstrong | June 2, 1925 |
| 1,917,113 | Gunther | July 4, 1933 |
| 2,091,546 | Hruska | Aug. 31, 1937 |
| 2,160,663 | Jensen | May 30, 1939 |
| 2,370,758 | Thompson | Mar. 6, 1945 |
| 2,415,667 | Wheeler | Feb. 11, 1947 |
| 2,416,794 | Crosby | Mar. 4, 1947 |